United States Patent

(12) United States Patent
Yoneyama

(10) Patent No.: US 8,238,036 B2
(45) Date of Patent: Aug. 7, 2012

(54) ZOOM LENS AND PHOTOGRAPHING APPARATUS HAVING THE SAME

(75) Inventor: Shuji Yoneyama, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 84 days.

(21) Appl. No.: 12/942,231

(22) Filed: Nov. 9, 2010

(65) Prior Publication Data

US 2011/0157719 A1    Jun. 30, 2011

(30) Foreign Application Priority Data

Dec. 24, 2009   (KR) .................. 10-2009-0131207

(51) Int. Cl.
*G02B 15/14* (2006.01)

(52) U.S. Cl. ........ 359/684; 359/683; 359/685; 359/686; 359/687; 359/715; 359/740; 359/774

(58) Field of Classification Search .......... 359/683–687, 359/715, 740, 772–774
See application file for complete search history.

(56) References Cited

U.S. PATENT DOCUMENTS

| 4,568,150 A | * | 2/1986 | Ikari et al. | 359/687 |
| 4,641,928 A | * | 2/1987 | Hamanishi | 359/687 |
| 4,659,189 A | * | 4/1987 | Kitagishi | 359/687 |
| 5,059,007 A | * | 10/1991 | Tanaka | 359/676 |
| 5,204,779 A | * | 4/1993 | Nakata et al. | 359/688 |
| 5,309,284 A | * | 5/1994 | Nakatsuji | 359/687 |
| 5,737,127 A | * | 4/1998 | Tsutsumi | 359/684 |
| 5,917,658 A | * | 6/1999 | Yamanashi | 359/676 |
| 7,218,457 B2 | * | 5/2007 | Sensui | 359/686 |

* cited by examiner

*Primary Examiner* — Evelyn A. Lester
(74) *Attorney, Agent, or Firm* — Drinker Biddle & Reath LLP

(57) ABSTRACT

A zoom lens includes, sequentially from an object side, a first lens group having a positive refractive power, a second lens group having a negative refractive power, a third lens group having a positive refractive power, and a fourth lens group. During zooming from a wide angle position to a telephoto position, the interval between the first lens group and the second lens group increases, the interval between the second lens group and the third lens group decreases, and an interval between the third lens group and the fourth lens group varies. The fourth lens group includes, sequentially from the object side, a first sub-lens group having a positive refractive power, a second sub-lens group having a negative refractive power, and a third sub-lens group. The second sub-lens group of the fourth lens group is moved along an optical axis to perform focusing.

16 Claims, 17 Drawing Sheets

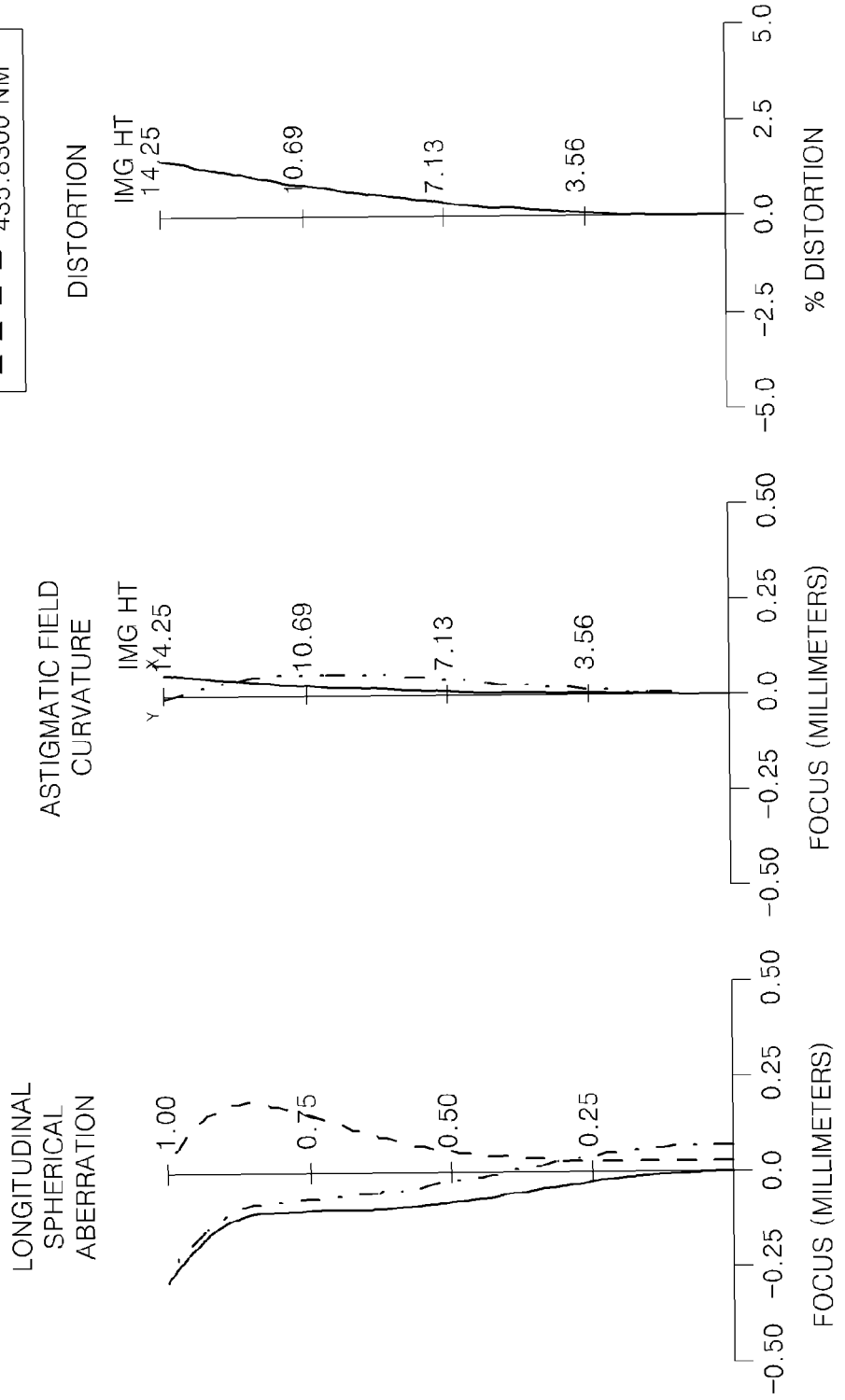

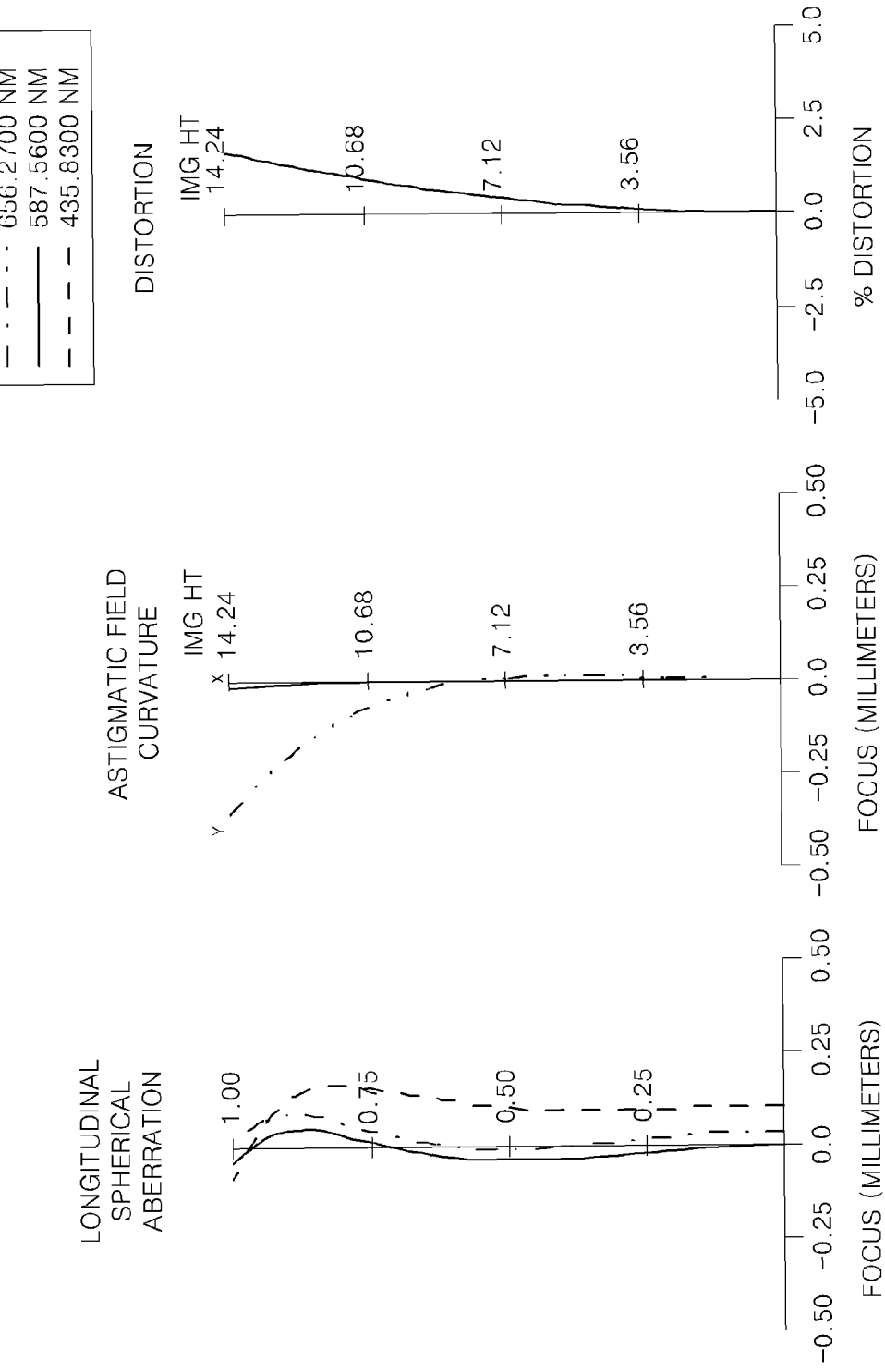

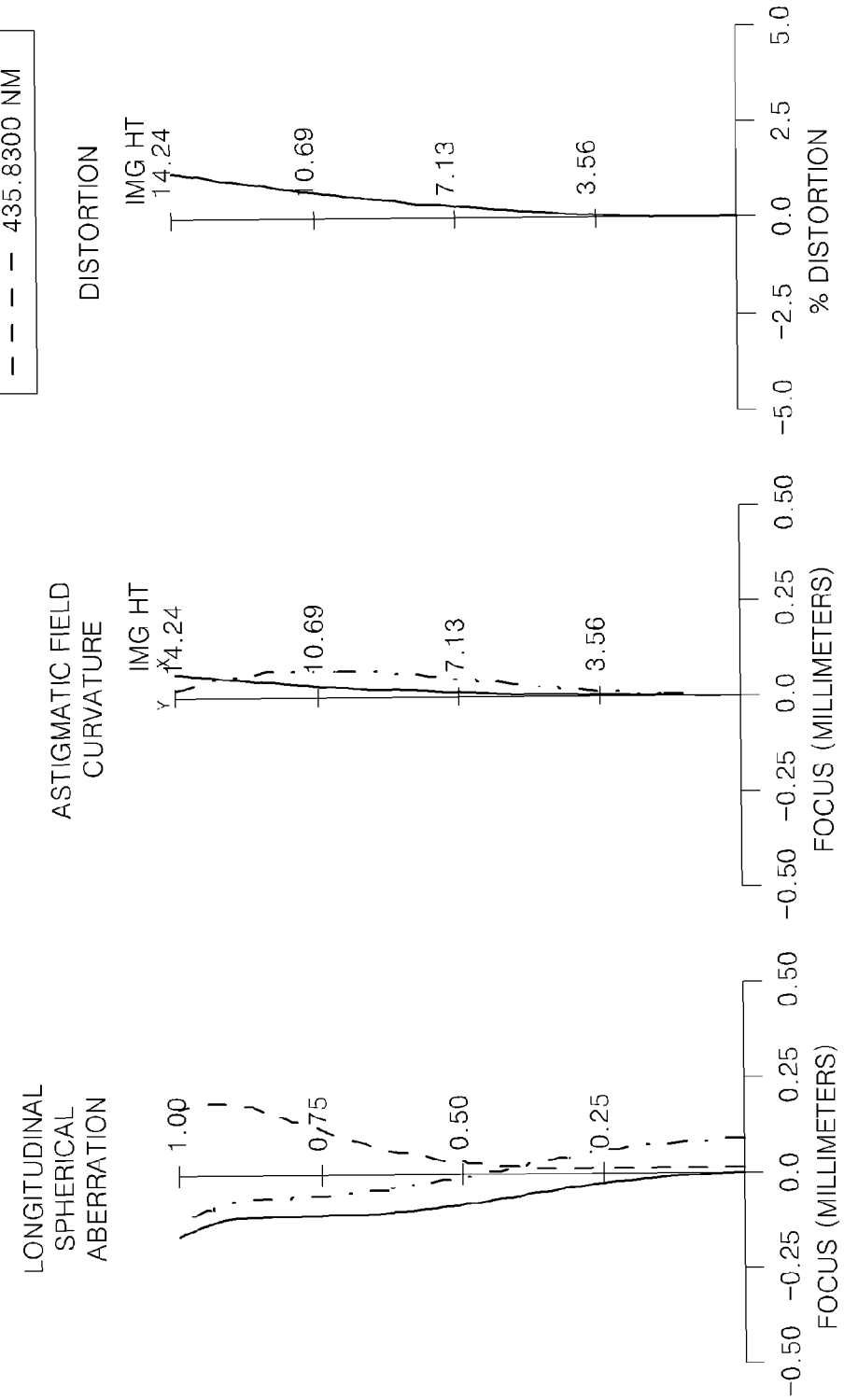

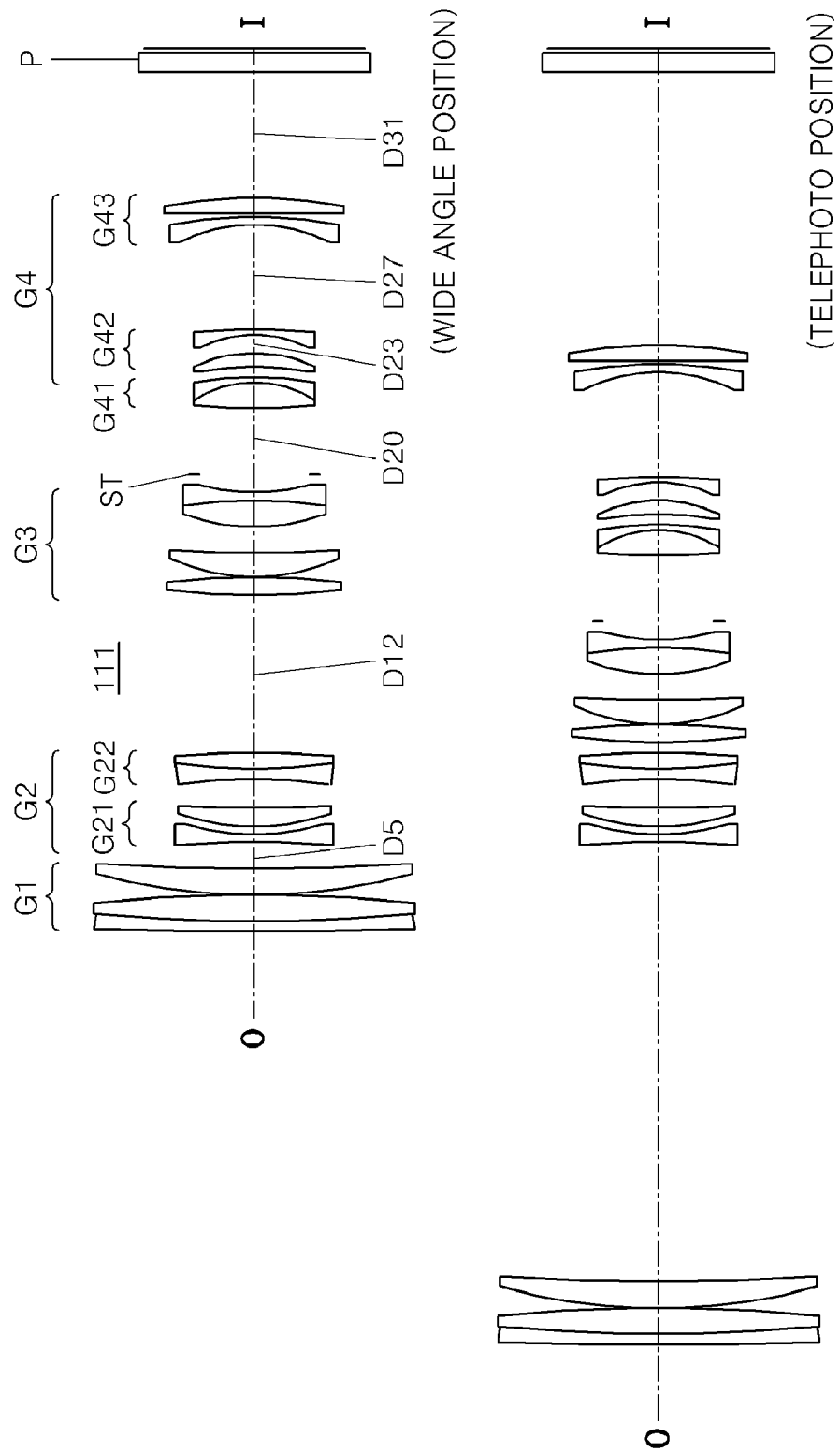

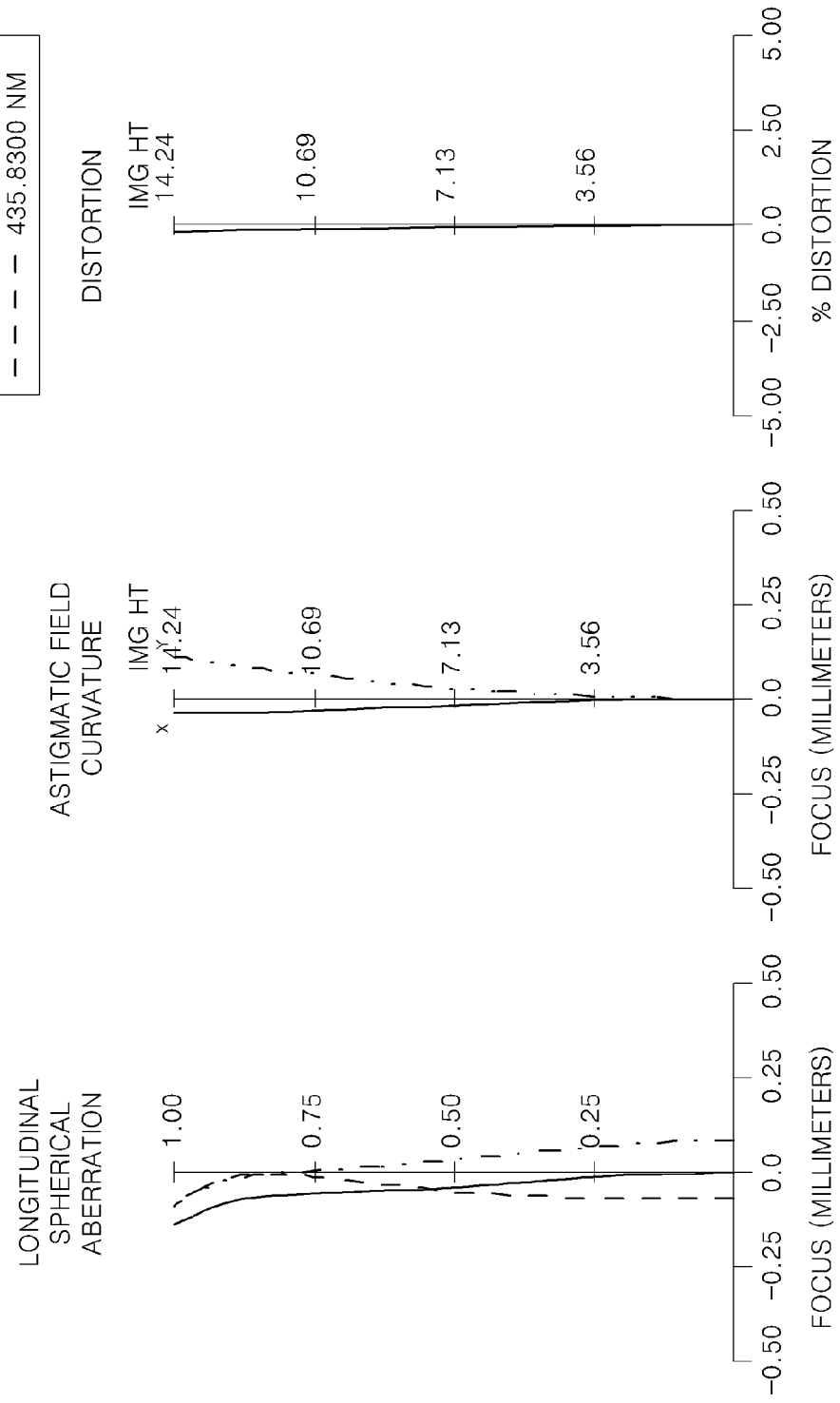

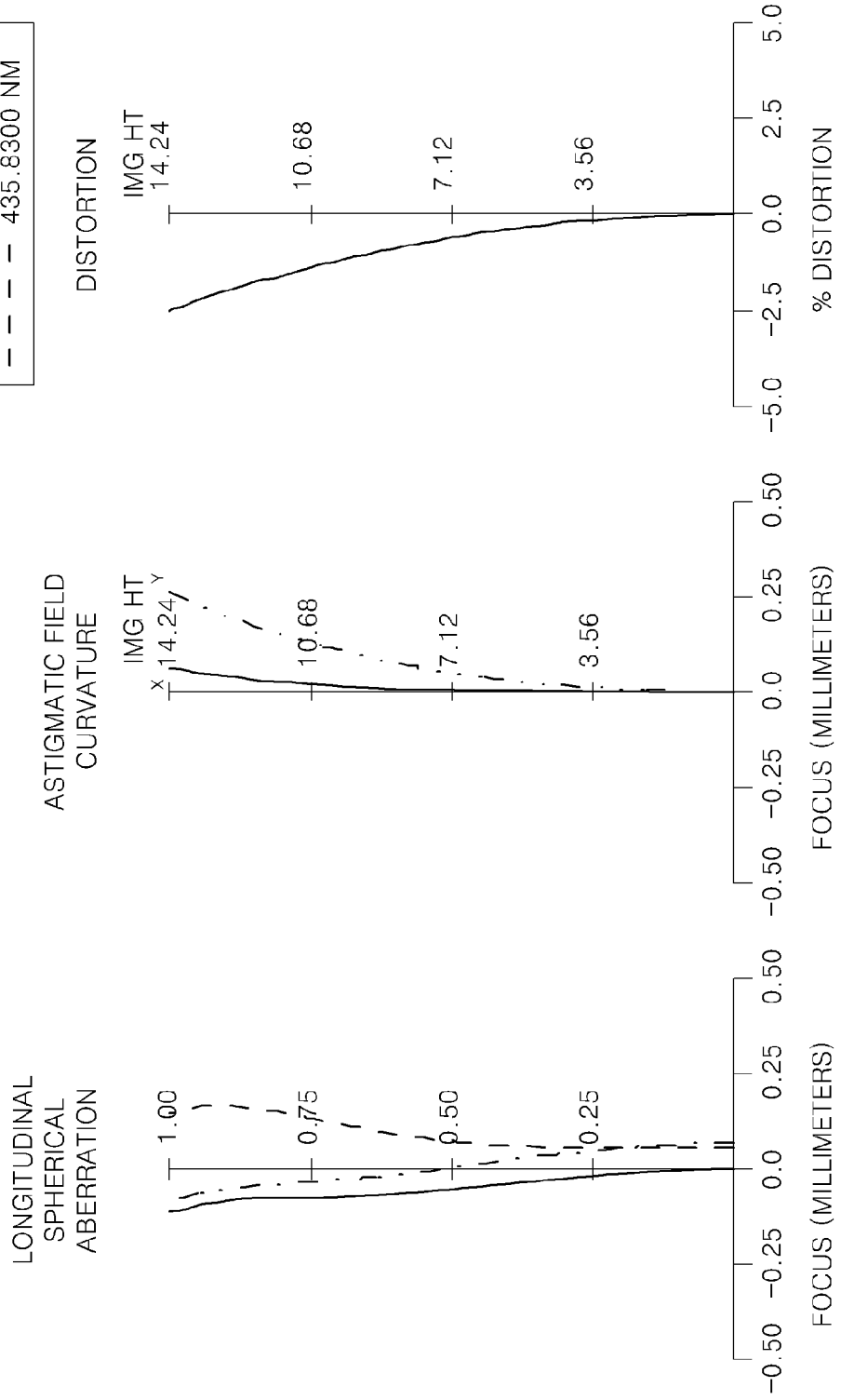

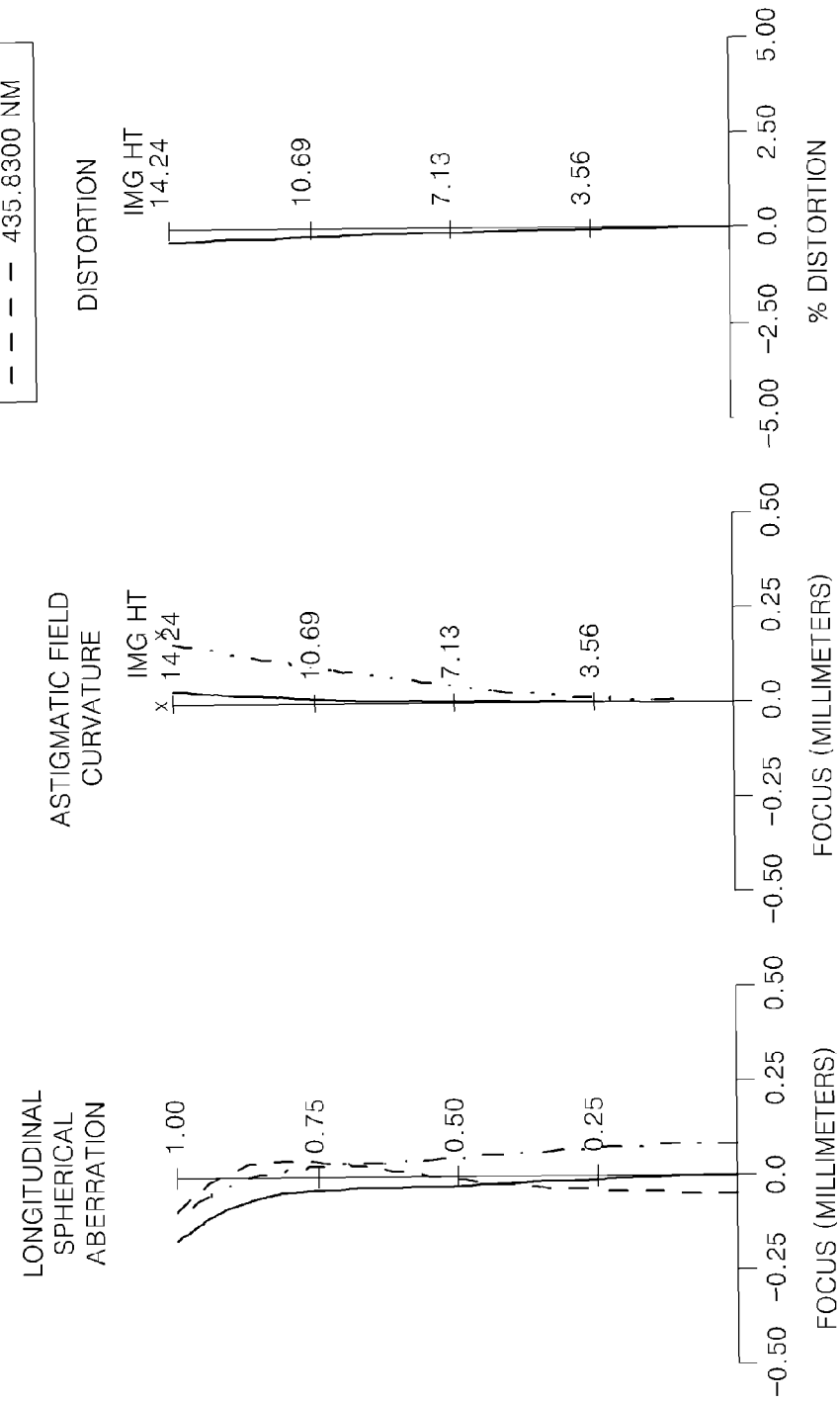

ZOOM LENS AND PHOTOGRAPHING APPARATUS HAVING THE SAME

CROSS-REFERENCE TO RELATED PATENT APPLICATIONS

This application claims the benefit of Korean Patent Application No. 10-2009-0131207, filed on Dec. 24, 2009, in the Korean Intellectual Property Office, the disclosure of which is incorporated herein in its entirety by reference.

BACKGROUND

1. Field of the Invention

The invention relates to a zoom lens and a photographing apparatus having the zoom lens.

2. Description of the Related Art

Zoom lenses employed for digital cameras or digital camcorders having image devices such as a charge coupled device (CCD) or a complementary metal-oxide semiconductor (CMOS) require a compact size and simultaneously a high optical performance. To achieve the high optical performance, an auto focusing function and/or an image-blur prevention function is employed in the photographing apparatus. A predetermined lens group is moved to perform the auto focusing function or image blur prevention function. A battery is widely used as a driving source to move the lens group. The miniaturization of a focusing lens group or an image-blur correction lens is needed to reduce the consumption of power of the driving source to move the lens group. As the size of a zoom lens decreases, interference may occur between the lens group that moves during zooming and the lens group that moves during focusing.

SUMMARY

To solve the above and/or other problems, an embodiment of the invention provides a zoom lens in which the lens group for focusing is made compact and the lens group moving for focusing and the lens group moving for zooming do not interfere with each other.

An embodiment of the invention provides a photographing apparatus having a zoom lens in which the lens group for focusing is made compact and the lens group moving for focusing and the lens group moving for zooming do not interfere with each other.

According to an aspect of the invention, a zoom lens includes, sequentially from an object side, a first lens group having a positive refractive power, a second lens group having a negative refractive power, a third lens group having a positive refractive power, and a fourth lens group, wherein, during zooming from a wide angle position to a telephoto position, the interval between the first lens group and the second lens group increases, the interval between the second lens group and the third lens group decreases, and the interval between the third lens group and the fourth lens group varies, and wherein the fourth lens group includes, sequentially from the object side, a first sub-lens group G4-1 having a positive refractive power, a second sub-lens group G4-2 having a negative refractive power, and a third sub-lens group G4-3, and the second sub-lens group G4-2 of the fourth lens group is moved along an optical axis to perform focusing.

The second sub-lens group G4-2 of the fourth lens group may include a first lens having a positive refractive power, and a second lens having a negative refractive power.

The zoom lens may satisfy the condition $-1.5 < f_{42}/fW \leftarrow 0.2$, where "$f_{42}$" denotes the focal length of the second sub-lens group G4-2 of the fourth lens group and "fW" denotes the overall focal length of the zoom lens at the wide angle position.

The zoom lens may satisfy the condition $0.3 < L4g/fW < 0.9$, where "L4g" denotes the overall length of the fourth lens group on the optical axis and "fW" denotes the overall focal length of the zoom lens at the wide angle position.

The zoom lens may satisfy the condition $0.4 < f1/fT < 0.9$, where "f1" denotes the focal length of the first lens group and "fT" denotes the overall focal length of the zoom lens at the telephoto position.

The second lens group may include, sequentially from the object side, a first sub-lens group G2-1 having a negative refractive power, and a second sub-lens group G2-2 having a negative refractive power.

The first sub-lens group G2-1 of the second lens group may move in a direction perpendicular to the optical axis to perform image blur correction.

The second sub-lens group G2-2 of the second lens group may move in a direction perpendicular to the optical axis to perform image blur correction.

The second lens group may move in a direction perpendicular to the optical axis to perform image blur correction.

The first sub-lens group G2-1 of the second lens group may include, sequentially from the object side, a first lens having a negative refractive power, and a second lens having a positive refractive power.

The second lens group may be fixed during zooming.

According to an embodiment of the invention, a photographing apparatus includes a zoom lens, and an image sensor for converting light focused by the zoom lens into an electric image signal, wherein the zoom lens includes, sequentially from an object side, a first lens group having a positive refractive power, a second lens group having a negative refractive power, a third lens group having a positive refractive power, and a fourth lens group, wherein, during zooming from a wide angle position to a telephoto position, the interval between the first lens group and the second lens group increases, the interval between the second lens group and the third lens group decreases, and the interval between the third lens group and the fourth lens group varies, and wherein the fourth lens group includes, sequentially from the object side, a first sub-lens group G4-1 having a positive refractive power, a second sub-lens group G4-2 having a negative refractive power, and a third sub-lens group G4-3, and the second sub-lens group G4-2 of the fourth lens group is moved along an optical axis to perform focusing.

BRIEF DESCRIPTION OF THE DRAWINGS

Various exemplary embodiments are described below in detail in connection with the attached drawings in which:

FIG. 2B is an aberration diagram of the zoom lens of FIG. 1 at a middle position;

FIG. 2C is an aberration diagram of the zoom lens of FIG. 1 at a telephoto position;

FIG. 4B is an aberration diagram of the zoom lens of FIG. 3 at a middle position;

FIG. 5 illustrates the configuration of a zoom lens according to another embodiment of the invention;

FIG. 6B is an aberration diagram of the zoom lens of FIG. 5 at a middle position;

FIG. 8A is an aberration diagram of the zoom lens of FIG. 7 at a wide angle position;

FIG. 8B is an aberration diagram of the zoom lens of FIG. 7 at a middle position;

DETAILED DESCRIPTION

Figure 1:
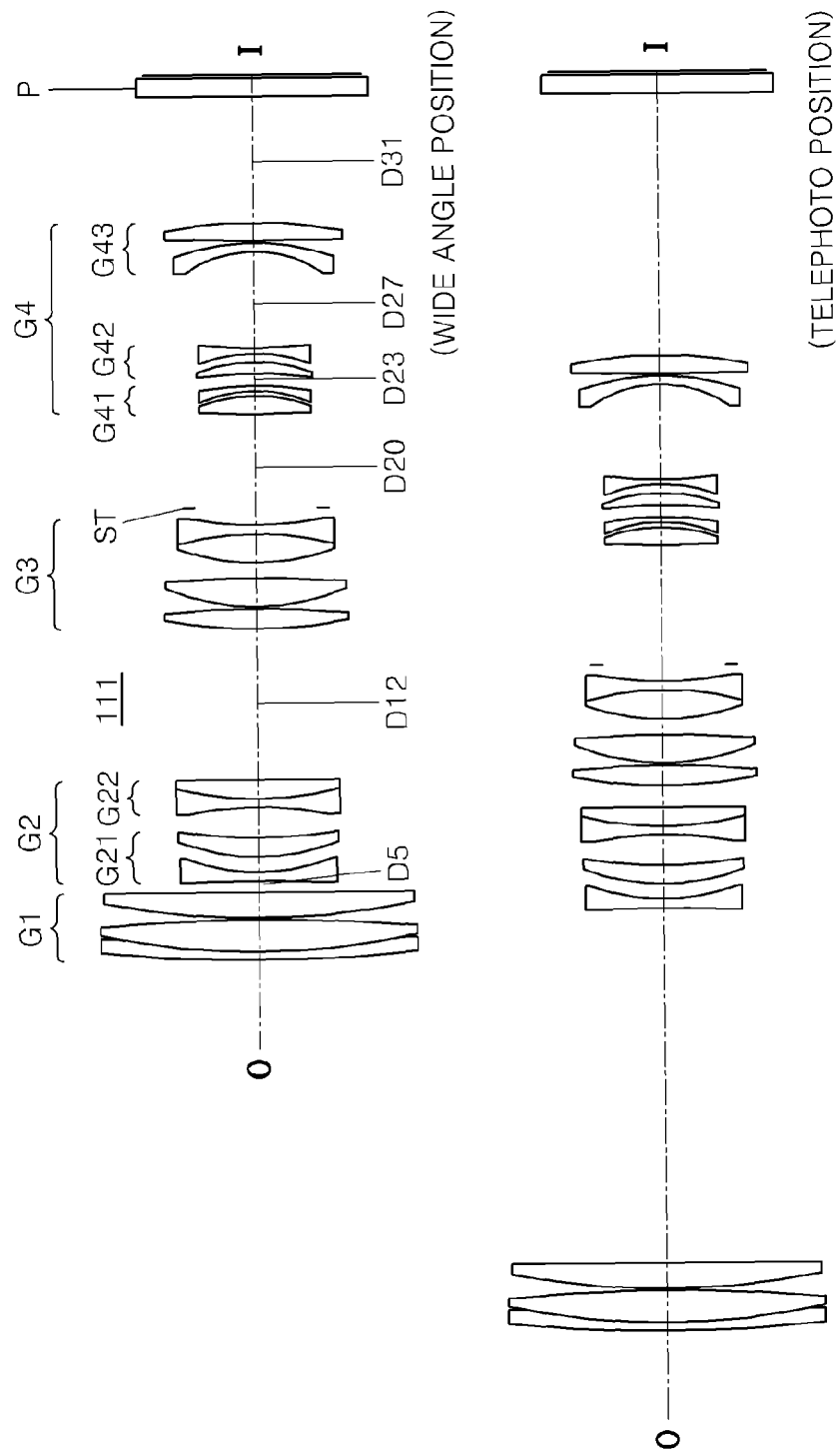
FIG. 1 illustrates the configuration of a zoom lens according to an embodiment of the invention.

The attached drawings for illustrating exemplary embodiments of the invention are referred to in order to gain a sufficient understanding of the invention, the merits thereof, and the objectives accomplished by the implementation of the invention. Hereinafter, embodiments of the invention will be described in detail with reference to the attached drawings. Like reference numerals in the drawings denote like elements.

Referring to FIG. 1, the zoom lens 111 according to the present embodiment sequentially includes a first lens group G1 having a positive refractive power, a second lens group G2 having a negative refractive power, a third lens group G3 having a positive refractive power, and a fourth lens group G4. The fourth lens group G4 may have a relatively weak power and have a positive refractive power or a negative refractive power. When the zoom lens 111 zooms from a wide angle position to a telephoto position, the interval between the first and second lens groups G1 and G2 may increase, the interval between the second and third lens groups G2 and G3 may decrease, and the interval between the third and fourth lens groups G3 and G4 may vary. Also, during zooming, the second lens group G2 may be fixed or moved. A reference letter P denotes a filter.

The fourth lens group G4 may include a plurality of sub-lens groups. Some of the sub-lens groups may perform focusing. The fourth lens group G4 may include three or more sub-lens groups. Of the fourth lens group G4, while a sub-lens group closest to an object side O and a sub-lens group closest to an image side I do not move during focusing, at least one of sub-lens groups located between the two sub-lens groups moves to perform focusing. Thus, the overall length of the fourth lens group G4 remains unchanged during focusing. This kind of focusing is referred to as an inner focusing method. For example, the fourth lens group G4 may include, sequentially from the object side O, a 4-1 sub-lens group G4-1 having a positive refractive power, a 4-2 sub-lens group G4-2, and a 4-3 sub-lens group G4-3. The 4-3 sub-lens group G4-3 may have a positive refractive power or a negative refractive power. The 4-2 sub-lens group G4-2 may perform focusing while moving along an optical axis.

When two sub-lens groups perform focusing, the two sub-lens groups may move at different speeds or in different directions. Since, of the fourth lens group, the sub-lens group located closest to the object side O and the sub-lens group located closest to the image side I are fixed during focusing, interference between movable lens groups due to the movement of other lens group may be prevented during moving and zooming of the focusing lens group.

When the focusing lens group is light, a focusing driving apparatus is made compact so as to contribute to the miniaturization of the whole zoom lens. The 4-2 sub-lens group G4-2 may include two lenses, for example, a first lens of the 4-2 sub-lens group having a positive refractive power and a second lens of the 4-2 sub-lens group having a negative refractive power. Also, aberration of the focusing lens group needs to be corrected to decrease a change in aberration even when the focusing lens group moves. When the 4-2 sub-lens group G4-2 includes two lenses respectively having positive and negative refractive powers, chromatic aberration, spherical aberration, and coma may be well corrected.

The 4-2 sub-lens group G4-2 may satisfy the following expression.

$$-1.5 < f_{42}/fW < -0.2 \quad \text{[Expression 1]}$$

In Expression 1, "$f_{42}$" denotes the focal length of the 4-2 sub-lens group and "fW" denotes the overall focal length of the zoom lens at a wide angle position. Expression 1 defines the power of the 4-2 sub-lens group. When "$f_{42}/fW$" exceeds the lower limit of Expression 1, the negative power of the 4-2 sub-lens group decreases and the amount of movement for focusing increases. Accordingly, the size of the fourth lens group increases so that the zoom lens may be made large. When "$f_{42}/fW$" exceeds the upper limit of Expression 1, the negative power of the 4-2 sub-lens group increases. While the amount of movement for focusing decreases, aberration increases.

The fourth lens group G4 may satisfy the following expression.

$$0.3 < L4g/fW < 0.9 \quad \text{[Expression 2]}$$

In Expression 2, "L4g" denotes the overall length of the fourth lens group G4 on the optical axis and "fW" denotes the overall focal length of a zoom lens at a wide angle position. Expression 2 defines the size of the fourth lens group G4. When "L4g/fW" exceeds the lower limit of Expression 2, the size of the fourth lens group G4 decreases. Also, it is difficult to secure a space in the fourth lens group G4, in which the 4-2 sub-lens group moves for focusing. When "L4g/fW" exceeds the upper limit of Expression 2, the size of the fourth lens group G4 increases so that the overall size of the zoom lens may increase, thereby deteriorating portability.

In the present embodiment, since focusing is performed by the fourth lens group in the inner focusing method as described above, the power of the first lens group G1 may be relatively weak compared to a case in which the first lens group G1 performs focusing.

The zoom lens according to an embodiment may satisfy the following expression.

$$0.4 < f1/fT < 0.9 \quad \text{[Expression 3]}$$

In Expression 3, "f1" denotes the focal length of the first lens group G1 and "fT" denotes the overall focal length of a zoom lens at the telephoto position. Expression 3 defines the power of the first lens group G1. When "f1/fT" exceeds the lower limit of Expression 3 and thus the power of the first lens group G1 increases, the spherical aberration of the first lens group G1 increases so that aberration may be increased by the subsequent lens groups at a telephoto position. Accordingly, it is difficult to sufficiently correct the spherical aberration of the overall zoom lens. When "f1/fT" exceeds the upper limit of Expression 3 and thus the power of the first lens group G1 decreases, the amount of movement of the first lens group increases during zooming so that the overall size of the zoom lens at the telephoto position may be increased.

In the present embodiment, the second lens group G2 may be used to reduce image blur due to vibration. The second lens group G2 may include, for example, sequentially from the object side O, a 2-1 sub-lens group G2-1 having a negative refractive power and a 2-2 sub-lens group G2-2 having a negative refractive power. Image blur may be corrected by moving the 2-1 sub-lens group G2-1 in a direction almost perpendicular to the optical axis. Or, the image blur may be corrected by moving the 2-2 sub-lens group G2-2 in a direction almost perpendicular to the optical axis. The 2-2 sub-lens group G2-2 may move along a partial trajectory of an imaginary large circle to correcting the image blur, and thus the 2-2 sub-lens group G2-2 may be considered to move in the direction almost perpendicular to the optical axis. Or, the image blur may be corrected by moving the whole second lens group G2.

The image blur correction lens group is arranged in the second lens group G2 because light focused by the first lens group G1 having a positive refractive power is incident on the second lens group G2. Accordingly, the second lens group G2 may have a relatively small diameter and be relatively light. Since the image blur correction lens group is moved, the image blur correction lens group may be preferably as light as possible. Thus, it is preferred that the vibration prevention is performed in the second lens group G2 that has a relatively small diameter and is relatively light. Furthermore, when the 2-1 sub-lens group G2-1 of the second lens group G2 performs image blur correction, a moving mechanism may be easily designed. In other words, since the 2-1 sub-lens group G2-1 and the 4-2 sub-lens group G4-2 are separated far away from each other, a space for installing a first moving mechanism to move the 2-1 sub-lens group G2-1 for image blur correction and a second moving mechanism to move the 4-2 sub-lens group G4-2 for focusing, are secured so that the first and second moving mechanisms may be easily designed. When the second lens group G2, the third lens group G3, and the fourth lens group g4 approach one another for focusing from the wide angle position to the telephoto position, a possibility of interference between the first moving mechanism to move the 2-1 sub-lens group G2-1 for image blur correction and the second moving mechanism to move the 4-2 sub-lens group G4-2 for focusing may be reduced.

As the moving lens group for image blur correction is implemented with as few lenses as possible in the second lens group G2 having a relatively small diameter, the moving lens group for image blur correction may be light. For example, the 2-1 sub-lens group G2-1 may include, sequentially from the object side O, a first lens having a negative refractive power and a second lens having a positive refractive power. The 2-1 sub-lens group G2-1 may include a plurality of lenses having a negative refractive power as a whole, and a single lens having a positive refractive power. For example, the lens at the object side O of the 2-1 sub-lens group G2-1 may be a doublet lens having a negative refractive power as a whole. However, when the 2-1 sub-lens group G2-1 is operated for image blur correction, it is preferable that the image blur correction lens group is as light as possible. Also, since distribution of power is needed for aberration correction, To satisfy the above two conditions, the 2-1 sub-lens group G2-1 may include a first lens having a negative refractive power and a second lens having a positive refractive power. Also, for aberration correction, a negative lens and a positive lens of the 2-1 sub-lens group G2-1 may be separated from each other to have an air interval and the negative lens may be arranged at the object side O. This is because, when the positive lens is arranged at the object side O of the 2-1 sub-lens group G2-1, light is focused with a positive power and thus the subsequent negative lens needs to have stronger negative power.

The second lens group G2 may be fixed or moved during zooming. For example, since the second lens group G2 having a mechanism to operate an image blur prevention lens group is heavy and needs electric wiring, the second lens group G2 may be fixed during zooming.

According to the present embodiment, since focusing is performed by the fourth lens group G4 in the inner focusing method, the interference between the focusing lens group and the lens groups, which move during zooming, may be prevented. Also, since the lens groups operated for focusing or image blur correction are light, the moving mechanisms may be designed to be small and arranged not to interfere with each other.

A variety of design data of a zoom lens according to an embodiment of the invention are shown below.

First Embodiment

FIG. 1 illustrates a zoom lens according to an embodiment of the invention. The following table shows design data according to the present embodiment.

| Lens Surface | Radius Curvature (R) | Surface Distance (D) | Refractive Power (Nd) | Abbe No. (Vd) |
|---|---|---|---|---|
| 1 | 176.484 | 1.30 | 1.80518 | 25.5 |
| 2 | 102.460 | 4.50 | 1.48749 | 70.4 |
| 3 | −233.768 | 0.10 | | |
| 4 | 95.195 | 3.59 | 1.49700 | 81.6 |
| 5 | 2479.446 | D5 | | |
| 6 | −219.980 | 1.20 | 1.83481 | 42.7 |
| 7 | 25.529 | 2.18 | | |
| 8 | 26.817 | 2.50 | 1.84666 | 23.8 |
| 9 | 53.283 | 4.36 | | |
| 10 | −48.385 | 1.20 | 1.83481 | 42.7 |
| 11 | 40.407 | 2.66 | 1.84666 | 23.8 |
| 12 | −4303.710 | D12 | | |
| 13 | 71.627 | 2.77 | 1.80610 | 33.3 |
| 14 | −95.087 | 0.10 | | |
| 15 | 27.514 | 4.07 | 1.49700 | 81.6 |
| 16 | −155.043 | 2.31 | | |
| 17 | 28.497 | 4.10 | 1.48749 | 70.4 |
| 18 | −37.591 | 1.00 | 1.84666 | 23.8 |
| 19 | 34.126 | 2.53 | | |
| 20 | Stop | D20 | | |
| 21 | 99.206 | 2.67 | 1.62588 | 35.7 |
| 22 | −18.227 | 0.59 | | |
| 23 | −16.616 | 0.80 | 1.83400 | 37.3 |
| 24 | −32.731 | D24 | | |
| 25 | −67.417 | 1.91 | 1.69895 | 30.1 |
| 26 | −19.245 | 1.11 | | |
| 27 | −19.063 | 0.80 | 1.83481 | 42.7 |
| 28 | 83.489 | D28 | | |
| 29 | −14.921 | 1.20 | 1.61800 | 63.4 |
| 30 | −29.934 | 0.10 | | |
| 31 | 157.282 | 2.65 | 1.83400 | 37.3 |
| 32 | −58.375 | D32 | | |
| 33 | Infinity | 2.80 | 1.51680 | 64.2 |
| 34 | Infinity | 0.54 | | |

The following table shows the zoom data of the zoom lens according to the present embodiment.

| Focal Length | 51.71 | 80.00 | 193.01 |
|---|---|---|---|
| FNO | 4.07 | 4.45 | 5.80 |
| D5 | 1.720 | 24.676 | 50.000 |
| D12 | 21.336 | 16.243 | 3.000 |
| D20 | 13.128 | 13.082 | 16.710 |
| D24 | 1.500 | 1.500 | 1.500 |
| D28 | 13.502 | 13.502 | 13.502 |
| D32 | 17.637 | 22.633 | 36.645 |

The following table shows the near distance data of the zoom lens according to the present embodiment.

| Magnification | 0.058X | 0.088X | 0.200X |
|---|---|---|---|
| Object Distance | 855.56 | 832.75 | 803.03 |
| D24 | 2.595 | 3.710 | 10.501 |
| D28 | 12.407 | 11.293 | 4.501 |

Figure 2A:
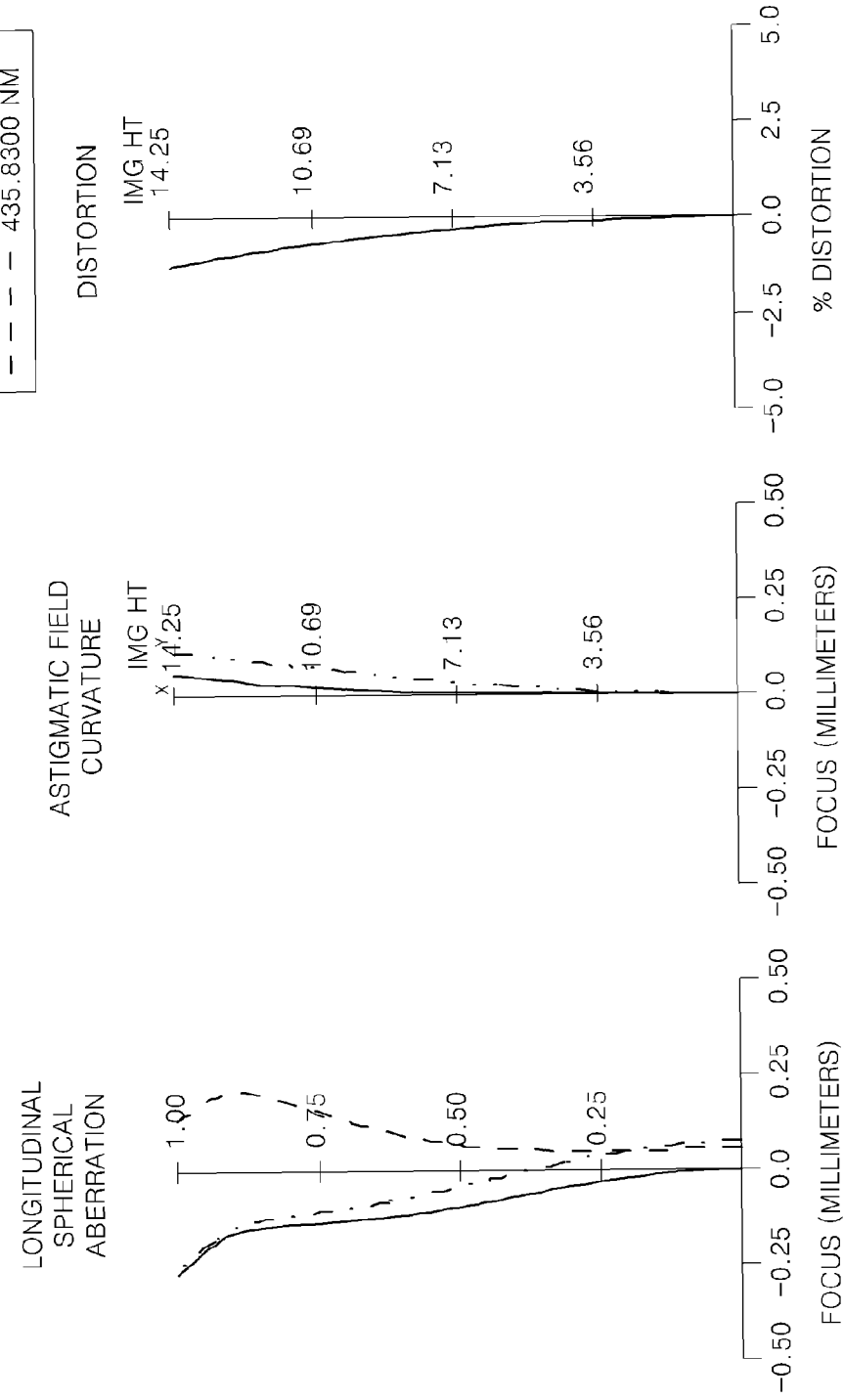
FIG. 2A is an aberration diagram of the zoom lens of FIG. 1 at a wide angle position.

FIGS. 2A, 2B, and 2C respectively illustrate spherical aberration, astigmatic field curves, and distortion of the zoom lens according to the present embodiment at a wide angle position, a middle position, and a telephoto position. Tangential field curvature T and sagittal field curvature S are illustrated as the astigmatic field curves.

Second Embodiment

Figure 3:
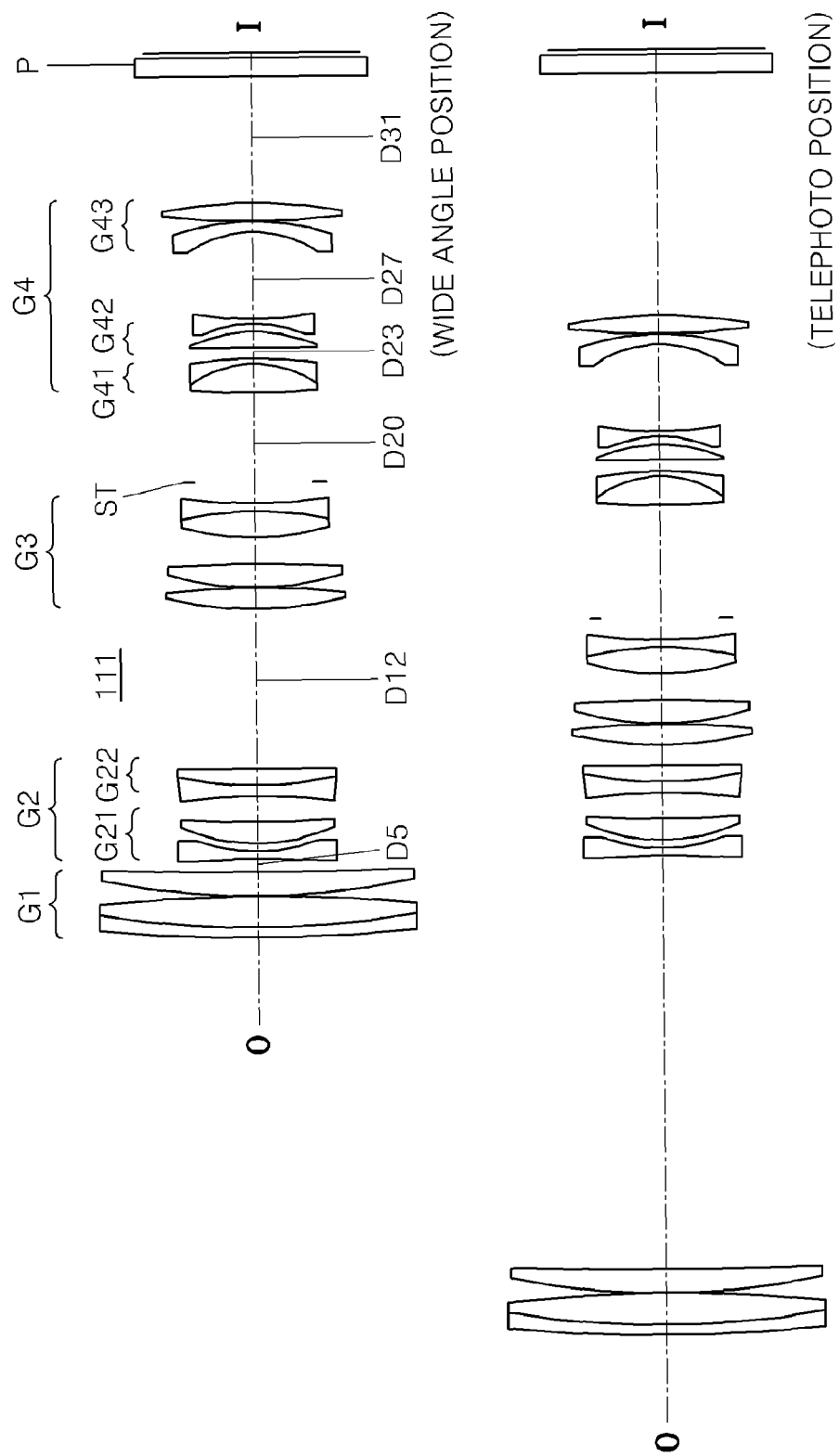
FIG. 3 illustrates the configuration of a zoom lens according to another embodiment of the invention.

FIG. 3 illustrates a zoom lens according to another embodiment of the invention. The following table shows the design data of the present embodiment.

| Lens Surface | Radius Curvature (R) | Surface Distance (D) | Refractive Power (Nd) | Abbe No. (Vd) |
|---|---|---|---|---|
| 1 | 197.867 | 1.30 | 1.80518 | 25.5 |
| 2 | 112.616 | 4.43 | 1.48749 | 70.4 |
| 3 | −209.910 | 0.10 | | |
| 4 | 102.712 | 3.23 | 1.49700 | 81.6 |
| 5 | 619.708 | D5 | | |
| 6 | −197.364 | 1.20 | 1.88300 | 40.8 |
| 7 | 25.308 | 1.28 | | |
| 8 | 26.244 | 2.66 | 1.84666 | 23.8 |
| 9 | 68.102 | 4.01 | | |
| 10 | −55.140 | 1.20 | 1.83481 | 42.7 |
| 11 | 50.539 | 2.34 | 1.84666 | 23.8 |
| 12 | Infinity | D12 | | |
| 13 | 52.453 | 2.83 | 1.83400 | 37.3 |
| 14 | −141.379 | 0.10 | | |
| 15 | 36.096 | 3.33 | 1.49700 | 81.6 |
| 16 | −222.736 | 3.76 | | |
| 17 | 32.407 | 3.81 | 1.48749 | 70.4 |
| 18 | −35.627 | 1.00 | 1.84666 | 23.8 |
| 19 | 45.633 | 2.85 | | |
| 20 | Stop | D20 | | |
| 21 | 100.767 | 4.06 | 1.74077 | 27.8 |
| 22 | −12.523 | 0.80 | 1.84666 | 23.8 |
| 23 | −38.113 | D23 | | |
| 24 | −120.634 | 2.21 | 1.69895 | 30.1 |
| 25 | −19.303 | 0.94 | | |
| 26 | −18.749 | 0.80 | 1.83481 | 42.7 |
| 27 | 48.952 | D27 | | |
| 28 | −14.324 | 1.20 | 1.61800 | 63.4 |
| 29 | −31.356 | 0.10 | | |
| 30 | 116.849 | 2.70 | 1.80610 | 33.3 |
| 31 | −62.223 | D31 | | |
| 32 | Infinity | 2.80 | 1.51680 | 64.2 |
| 33 | Infinity | 0.54 | | |

The following table shows the zoom data of the zoom lens according to the present embodiment.

| Focal Length | 51.88 | 80.03 | 193.42 |
|---|---|---|---|
| FNO | 4.15 | 4.61 | 5.77 |
| D5 | 1.802 | 26.501 | 58.296 |
| D12 | 22.784 | 17.227 | 3.000 |
| D20 | 12.792 | 12.612 | 16.291 |
| D23 | 1.500 | 1.500 | 1.500 |
| D27 | 12.398 | 12.398 | 12.398 |
| D31 | 17.646 | 23.381 | 33.925 |

The following table shows the near distance data of the zoom lens according to the present embodiment.

| Magnification | 0.058X | 0.088X | 0.193X |
|---|---|---|---|
| Object Distance | 855.55 | 830.86 | 799.07 |
| D23 | 2.439 | 3.300 | 9.081 |
| D27 | 11.459 | 10.598 | 4.818 |

Figure 4A:
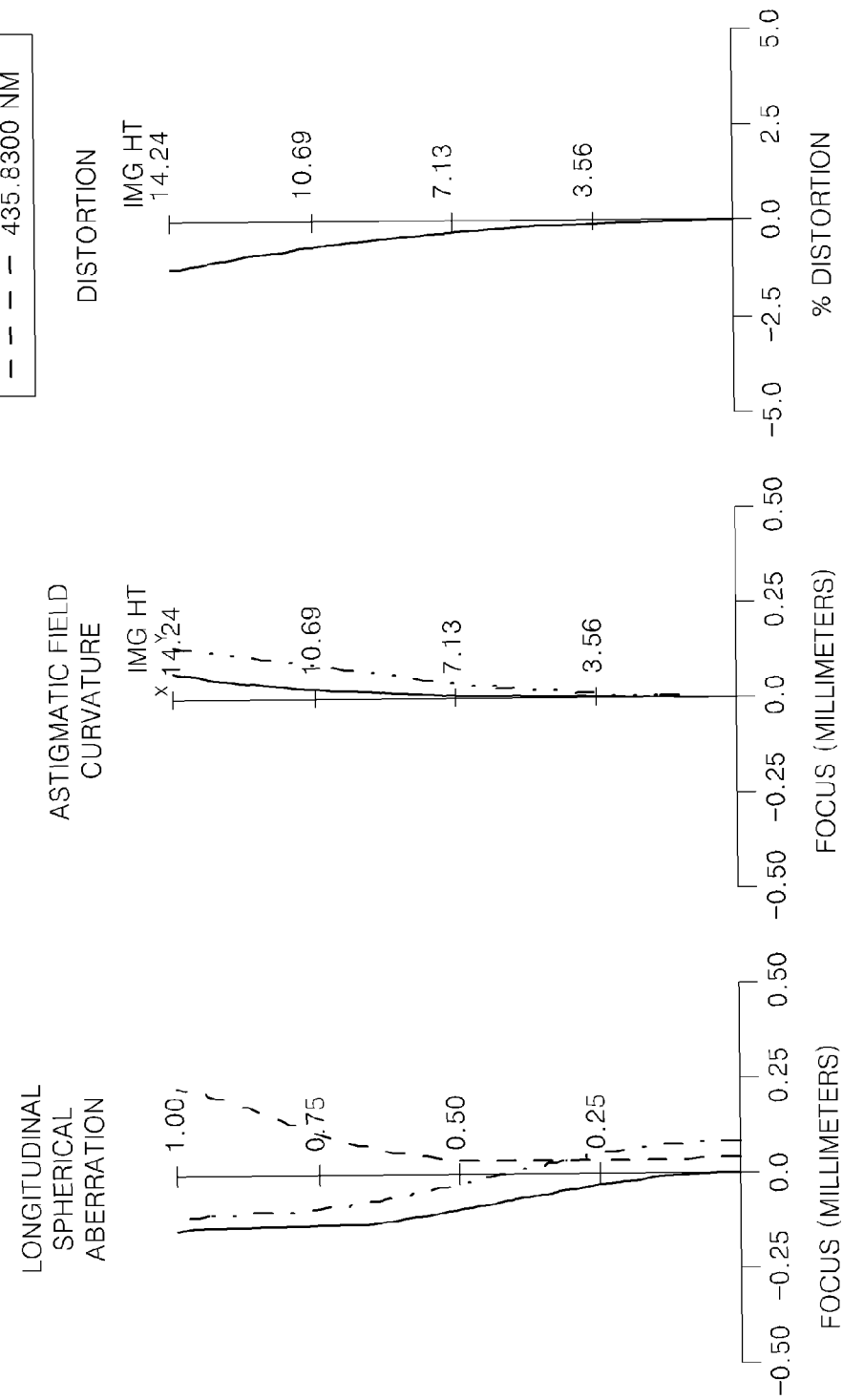
FIG. 4A is an aberration diagram of the zoom lens of FIG. 3 at a wide angle position.
Figure 4C:
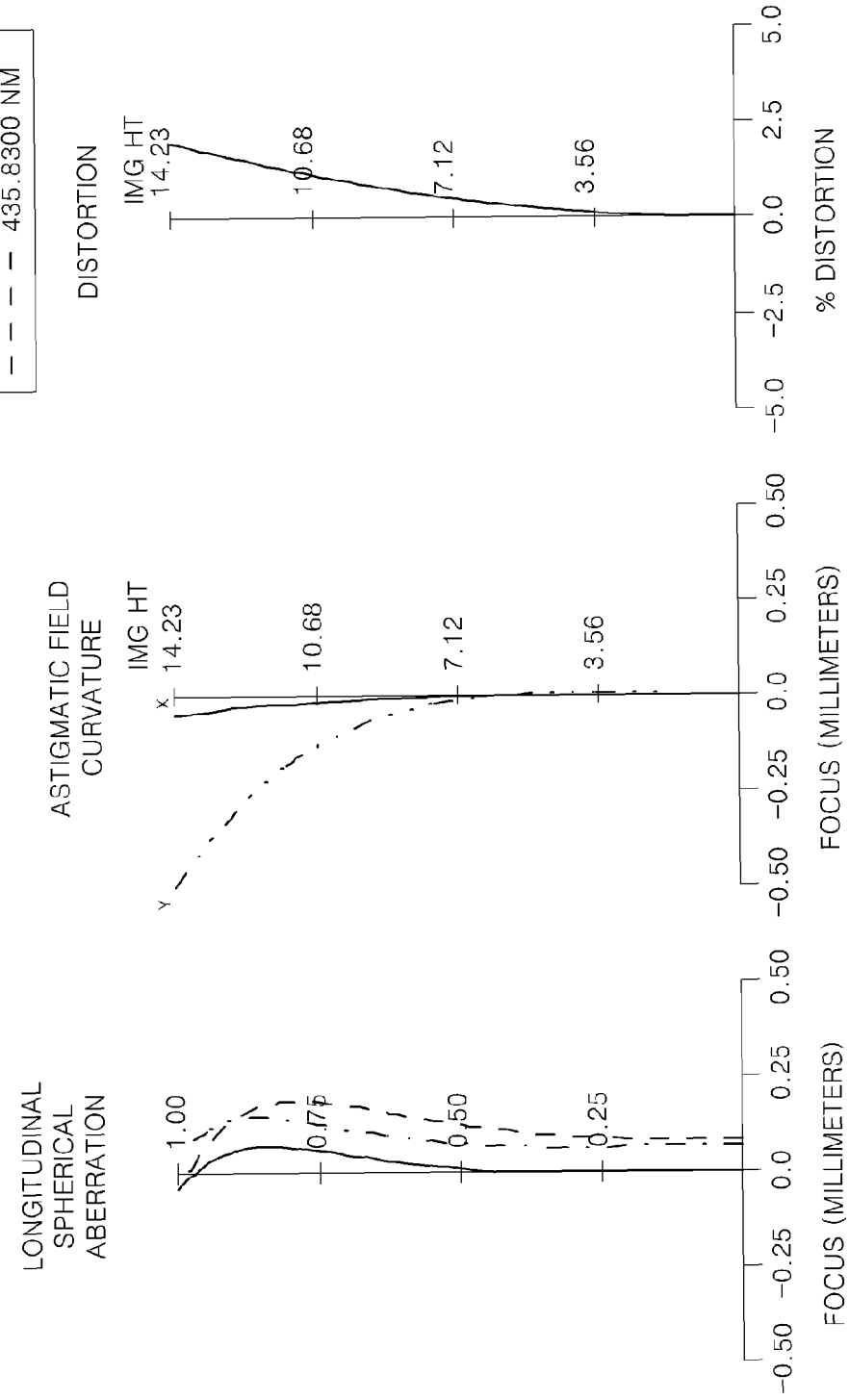
FIG. 4C is an aberration diagram of the zoom lens of FIG. 3 at a telephoto position.

FIGS. 4A, 4B, and 4C respectively illustrate spherical aberration, astigmatic field curves, and distortion of the zoom lens according to the present embodiment at a wide angle position, a middle position, and a telephoto position.

Third Embodiment

FIG. 5 illustrates a zoom lens according to another embodiment of the invention. The following table shows the design data of the present embodiment.

| Lens Surface | Radius Curvature (R) | Surface Distance (D) | Refractive Power (Nd) | Abbe No. (Vd) |
|---|---|---|---|---|
| 1 | 858.344 | 1.30 | 1.80518 | 25.5 |
| 2 | 205.768 | 3.81 | 1.48749 | 70.4 |
| 3 | −180.188 | 0.10 | | |
| 4 | 75.116 | 3.69 | 1.49700 | 81.6 |
| 5 | 330.598 | D5 | | |
| 6 | −128.574 | 1.20 | 1.83481 | 42.7 |
| 7 | 27.656 | 0.98 | | |
| 8 | 28.218 | 2.64 | 1.84666 | 23.8 |
| 9 | 73.248 | 4.29 | | |
| 10 | −56.111 | 1.20 | 1.88300 | 40.8 |
| 11 | 59.092 | 2.22 | 1.84666 | 23.8 |
| 12 | −544.251 | D12 | | |
| 13 | 63.664 | 2.76 | 1.83400 | 37.3 |
| 14 | −87.690 | 0.10 | | |
| 15 | 24.320 | 3.40 | 1.49700 | 81.6 |
| 16 | 155.230 | 3.67 | | |
| 17 | 26.306 | 3.68 | 1.48749 | 70.4 |
| 18 | −45.959 | 1.00 | 1.84666 | 23.8 |
| 19 | 25.514 | 2.62 | | |
| 20 | Stop | D20 | | |
| 21 | 126.618 | 3.69 | 1.74950 | 35.0 |
| 22 | −12.583 | 0.80 | 1.83400 | 37.3 |
| 23 | −41.017 | D23 | | |
| 24 | −36.414 | 1.69 | 1.69895 | 30.1 |
| 25 | −19.340 | 2.49 | | |
| 26 | −18.309 | 0.80 | 1.83481 | 42.7 |
| 27 | −149.946 | D27 | | |

-continued

| Lens Surface | Radius Curvature (R) | Surface Distance (D) | Refractive Power (Nd) | Abbe No. (Vd) |
|---|---|---|---|---|
| 28 | −20.888 | 1.20 | 1.61800 | 63.4 |
| 29 | −49.124 | 0.10 | | |
| 30 | 389.471 | 2.44 | 1.80610 | 33.3 |
| 31 | −58.922 | D31 | | |
| 32 | Infinity | 2.80 | 1.51680 | 64.2 |
| 33 | Infinity | 0.53 | | |

The following table shows the zoom data of the zoom lens according to the present embodiment.

| Focal Length | 51.90 | 80.08 | 193.50 |
|---|---|---|---|
| FNO | 4.13 | 4.68 | 5.78 |
| D5 | 3.519 | 27.678 | 62.029 |
| D12 | 22.237 | 16.001 | 1.500 |
| D20 | 9.386 | 7.847 | 9.352 |
| D23 | 1.500 | 1.500 | 1.500 |
| D27 | 14.982 | 14.982 | 14.982 |
| D31 | 17.656 | 25.431 | 38.428 |

The following table shows the near distance data of the zoom lens according to the present embodiment.

| Magnification | 0.0583 | 0.0885 | 0.2009 |
|---|---|---|---|
| Object Distance | 855.511 | 831.341 | 797.020 |
| D23 | 2.886 | 4.088 | 12.868 |
| D27 | 13.595 | 12.394 | 3.614 |

Figure 6A:
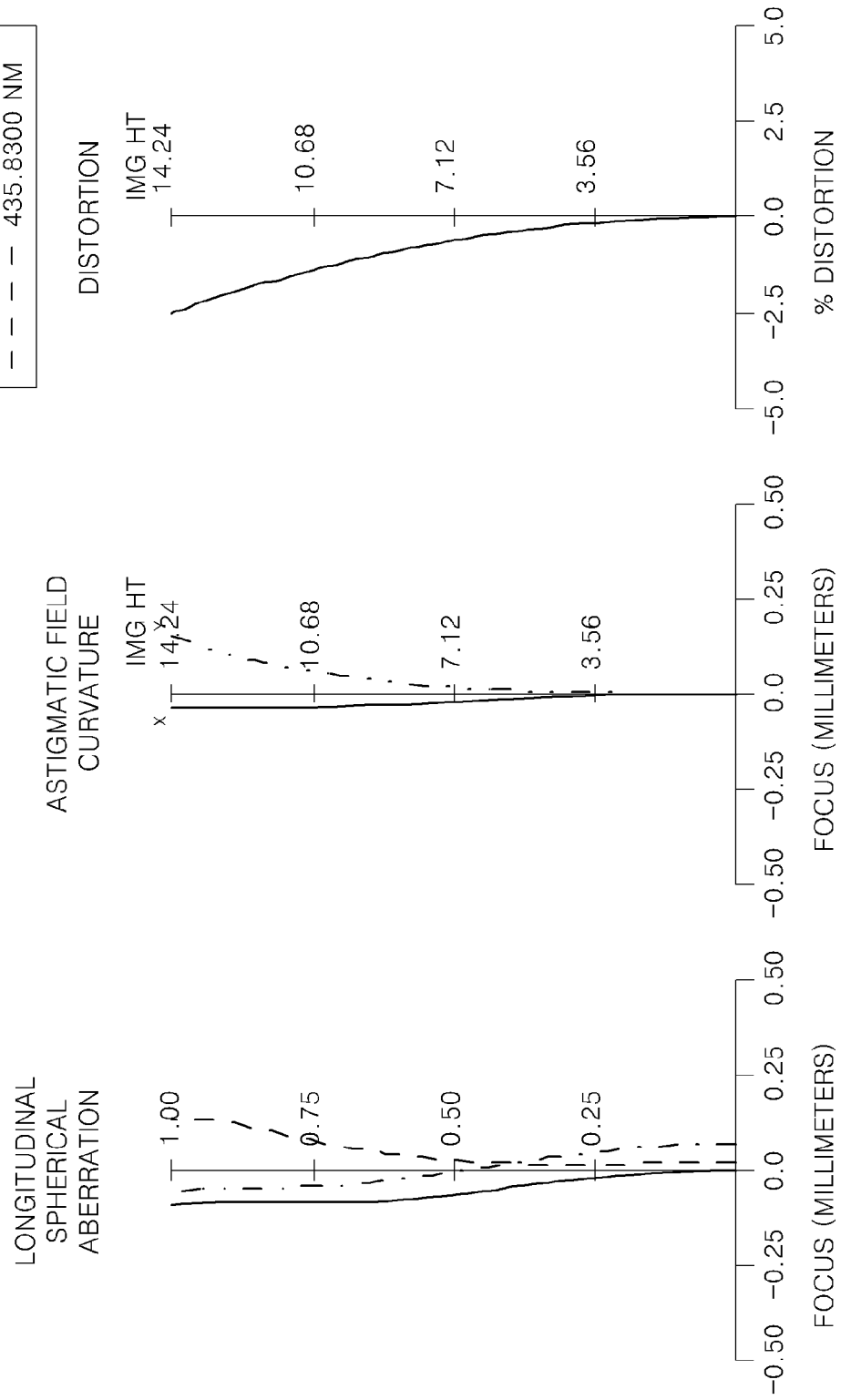
FIG. 6A is an aberration diagram of the zoom lens of FIG. 5 at a wide angle position.
Figure 6C:
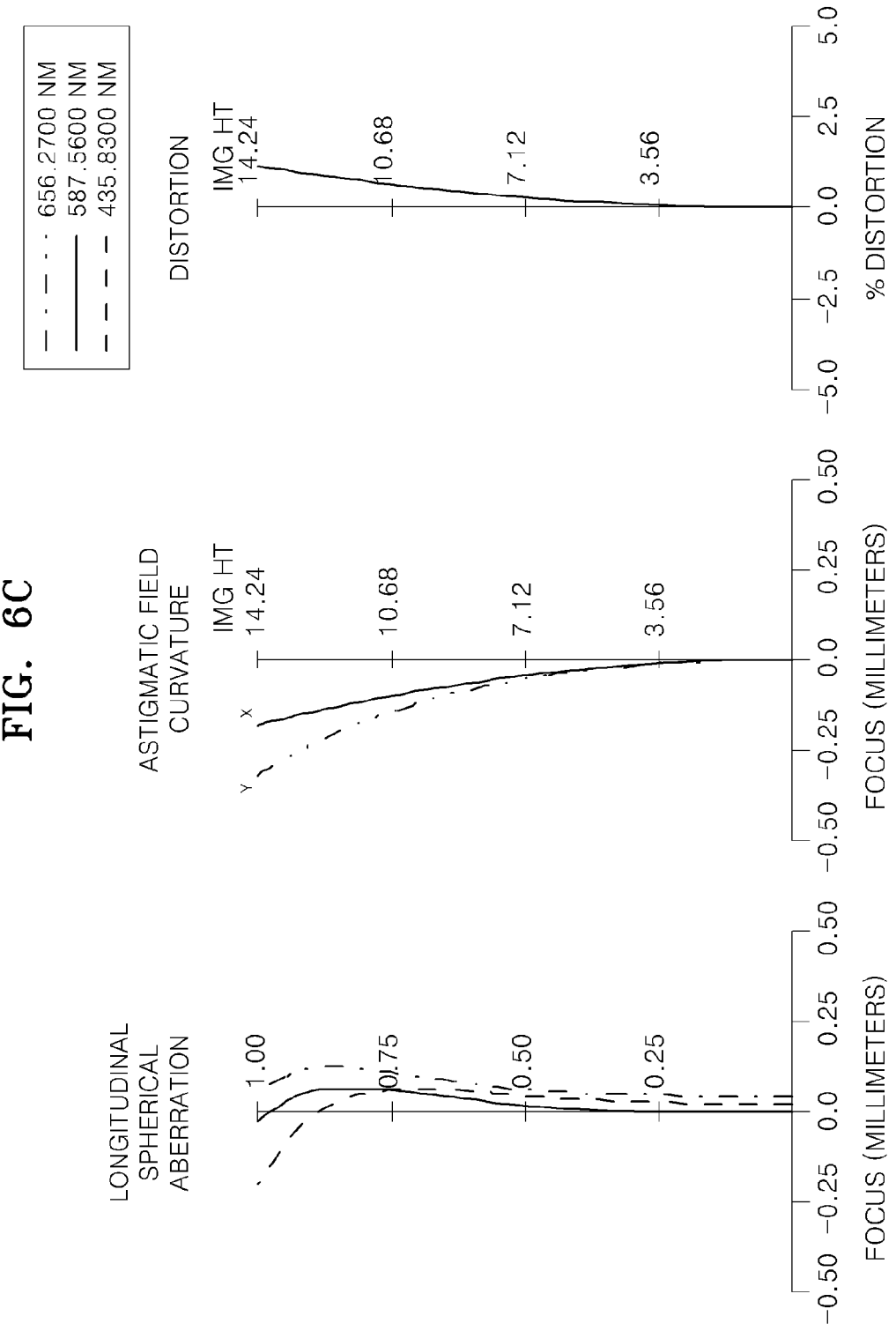
FIG. 6C is an aberration diagram of the zoom lens of FIG. 5 at a telephoto position.

FIGS. 6A, 6B, and 6C respectively illustrate spherical aberration, astigmatic field curves, and distortion of the zoom lens according to the present embodiment at a wide angle position, a middle position, and a telephoto position.

Fourth Embodiment

Figure 7:
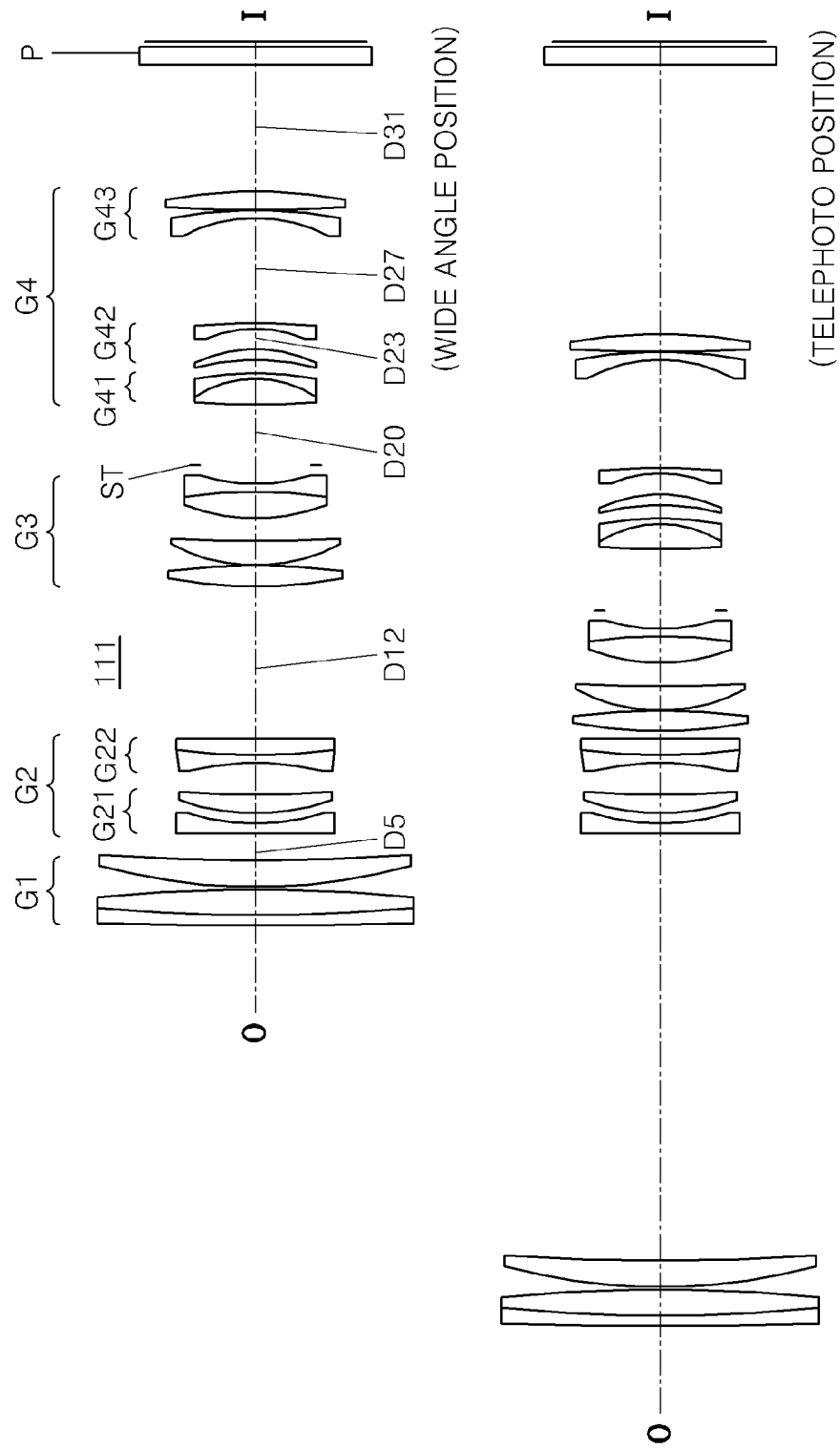
FIG. 7 illustrates the configuration of a zoom lens according to another embodiment of the invention.

FIG. 7 illustrates a zoom lens according to another embodiment of the invention. The following table shows the design data of the present embodiment.

| Lens Surface | Radius Curvature (R) | Surface Distance (D) | Refractive Power (Nd) | Abbe No. (Vd) |
|---|---|---|---|---|
| 1 | 682.727 | 1.30 | 1.80518 | 25.5 |
| 2 | 190.659 | 3.90 | 1.48749 | 70.4 |
| 3 | −178.208 | 0.10 | | |
| 4 | 67.542 | 3.71 | 1.49700 | 81.6 |
| 5 | 222.157 | D5 | | |
| 6 | −195.946 | 1.20 | 1.83481 | 42.7 |
| 7 | 25.905 | 1.44 | | |
| 8 | 27.146 | 2.68 | 1.84666 | 23.8 |
| 9 | 67.921 | 4.37 | | |
| 10 | −52.368 | 1.20 | 1.88300 | 40.8 |
| 11 | 57.368 | 2.23 | 1.84666 | 23.8 |
| 12 | −630.280 | D12 | | |
| 13 | 58.642 | 2.83 | 1.83400 | 37.3 |
| 14 | −87.116 | 0.10 | | |
| 15 | 24.325 | 3.27 | 1.49700 | 81.6 |
| 16 | 116.244 | 3.18 | | |
| 17 | 23.587 | 3.78 | 1.48749 | 70.4 |
| 18 | −50.181 | 1.00 | 1.84666 | 23.8 |
| 19 | 23.263 | 2.74 | | |
| 20 | Stop | D20 | | |
| 21 | 158.968 | 3.67 | 1.74950 | 35.0 |
| 22 | −12.330 | 0.80 | 1.83400 | 37.3 |
| 23 | −38.046 | D23 | | |

-continued

| Lens Surface | Radius Curvature (R) | Surface Distance (D) | Refractive Power (Nd) | Abbe No. (Vd) |
|---|---|---|---|---|
| 24 | −30.423 | 1.60 | 1.69895 | 30.1 |
| 25 | −18.589 | 2.82 | | |
| 26 | −17.901 | 0.80 | 1.83481 | 42.7 |
| 27 | −92.802 | D27 | | |
| 28 | −20.790 | 1.20 | 1.61800 | 63.4 |
| 29 | −57.361 | 0.10 | | |
| 30 | 403.359 | 2.53 | 1.80610 | 33.3 |
| 31 | −53.208 | D31 | | |
| 32 | Infinity | 2.80 | 1.51680 | 64.2 |
| 33 | Infinity | 0.53 | | |

The following table shows the zoom data of the zoom lens according to the present embodiment.

| Focal Length | 51.909 | 80.123 | 193.211 |
|---|---|---|---|
| FNO | 4.12 | 4.70 | 5.77 |
| D5 | 3.998 | 27.415 | 60.536 |
| D12 | 21.801 | 15.717 | 1.500 |
| D20 | 8.630 | 6.980 | 8.672 |
| D23 | 1.696 | 1.696 | 1.696 |
| D27 | 14.826 | 14.826 | 14.826 |
| D31 | 17.656 | 25.390 | 37.916 |

The following table shows the near distance data of the zoom lens according to the present embodiment.

| Magnification | 0.058X | 0.089X | 0.200X |
|---|---|---|---|
| Object Distance | 855.513 | 832.081 | 798.982 |
| D23 | 3.063 | 4.248 | 12.983 |
| D27 | 13.459 | 12.273 | 3.538 |

Figure 8C:
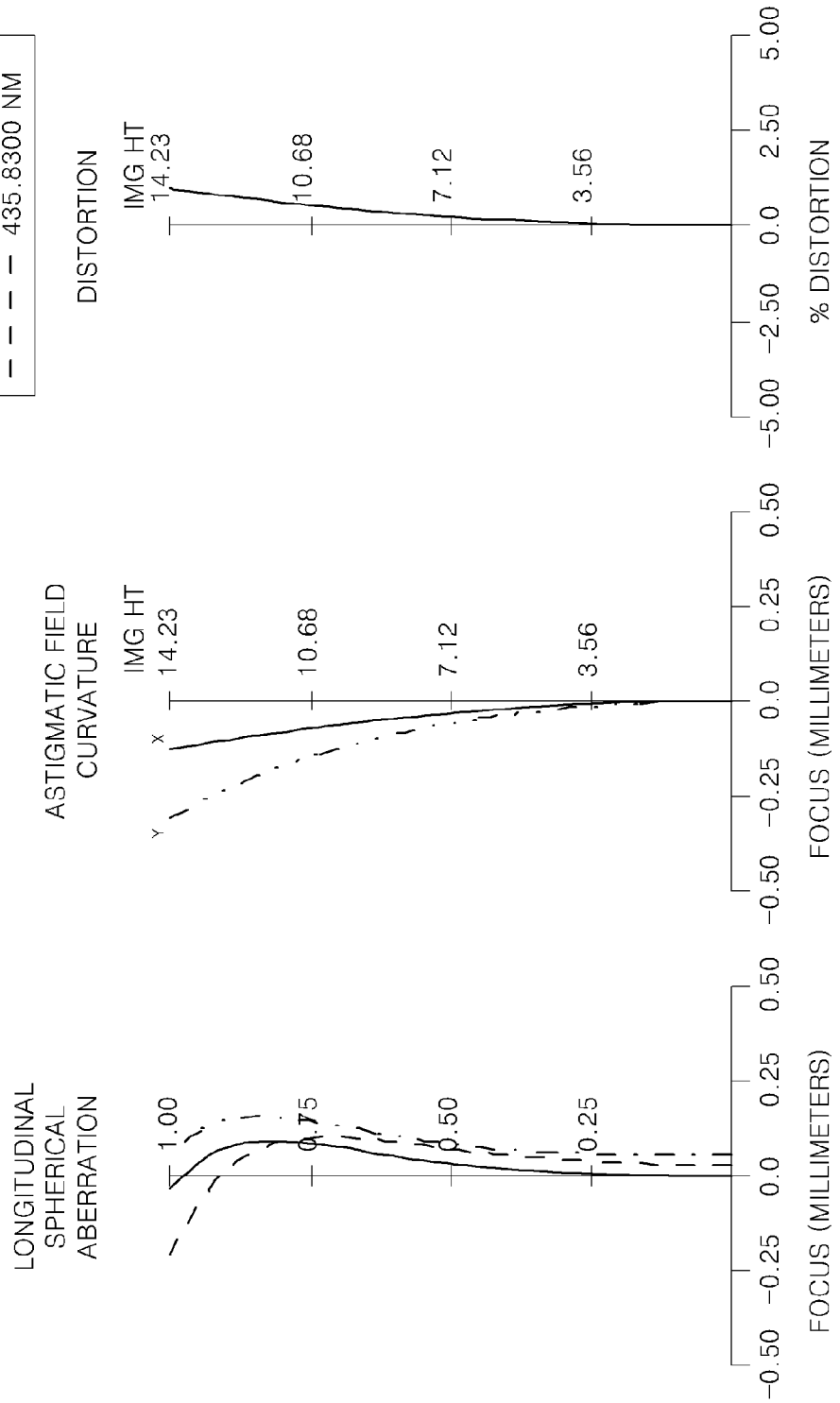
FIG. 8C is an aberration diagram of the zoom lens of FIG. 7 at a telephoto position.

FIGS. 8A, 8B, and 8C respectively illustrate spherical aberration, astigmatic field curves, and distortion of the zoom lens according to the present embodiment at a wide angle position, a middle position, and a telephoto position.

The following table shows that the above embodiments satisfy the three conditions of Expressions 1-3.

| Expression | $1^{st}$ Embodiment | $2^{nd}$ Embodiment | $3^{rd}$ Embodiment | $4^{th}$ Embodiment |
|---|---|---|---|---|
| Expression 1 (f4-2/fW) | −0.728 | −0.649 | −0.903 | −0.906 |
| Expression 2 (L4g/fW) | 0.519 | 0.515 | 0.572 | 0.579 |
| Expression 3 (f1/fT) | 0.608 | 0.682 | 0.713 | 0.697 |

As described above, since the zoom lens according to an embodiment of the invention performs focusing according to the inner focusing method, interference between the lens group for zooming and the focusing lens group in a compact zoom lens may be prevented. Also, since the focusing lens group is light, the mechanism to move the focusing lens group is easily designed. Since the zoom lens according to an embodiment of the invention is applicable to a telephoto zooming lens and includes the image blur correction lens group, a high quality picture may be photographed. Also, since the image blur correction lens group is light, the mechanism to move the image blur correction lens group is easily designed.

A zoom lens according to an embodiment of the invention may be suitably used for a photographing apparatus using an image sensor such as CCD or CMOS; for example, a digital still camera, a single lens reflex camera, a portable terminal, and a video camera. Also, the zoom lens according to an embodiment of the invention may be suitably used for a photographing apparatus having a relatively short back focal length and an electronic viewfinder.

Figure 9:
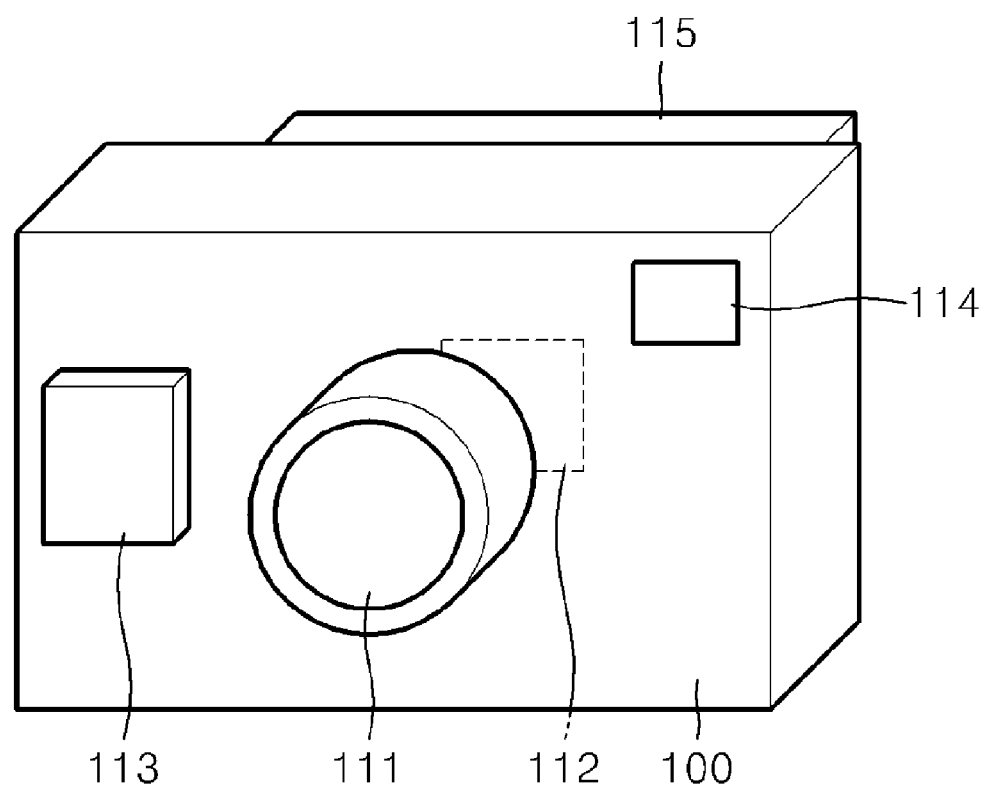
FIG. 9 is a perspective view schematically illustrating a photographing apparatus according to an embodiment of the invention.

FIG. 9 is a perspective view schematically illustrating a photographing apparatus 100 having a zoom lens 111 according to an embodiment of the invention. Referring to FIG. 9, the photographing apparatus 100 according to the present embodiment includes a zoom lens 111 that has been described above according to a variety of embodiments and an imaging sensor 112 for converting light focused by the zoom lens 111 into an electrical image signal. The photographing apparatus 100 may include a recording unit 113 for recording information corresponding to an object image that is photoelectrically converted from the imaging sensor 112, and a viewfinder 114 for observing the object image. The photographing apparatus 100 may further include a display unit 115 for displaying the object image. Although in the present embodiment the viewfinder 114 and the display unit 115 are separately provided, an electronic viewfinder used as a display unit and a viewfinder may only be provided without a separate viewfinder. The zoom lens according to an embodiment of the invention may be used not only for a single lens reflex camera having a reflection mirror and an optical finder but also for a camera having an electronic viewfinder. Since the camera having the electronic viewfinder has no reflection mirror, the back focal length is decreased. Thus, compared to the single reflex camera, a relatively large installation space for the fourth lens group that is used as a focusing lens group may be secured.

The photographing apparatus of FIG. 9 is merely an embodiment and is not limited thereto and may be applied to a variety of optical apparatuses.

Since the zoom lens according to an embodiment of the invention performs focusing in the inner focusing method, the interference between the lens group for zooming and the focusing lens group in a compact zoom lens may be prevented. Also, since the focusing lens is light, the mechanism to move the focusing lens group may be easily designed. The zoom lens according to an embodiment of the invention may be applicable to the zoom lens and include the image blur correction lens group, so that a high quality picture may be photographed.

While various embodiments have been shown and described herein, it will be understood by those skilled in the art that various changes in form and details may be made therein without departing from the spirit and scope of the invention as defined by the appended claims.

What is claimed is:

1. A zoom lens comprising, sequentially from an object side:
   a first lens group having a positive refractive power;
   a second lens group having a negative refractive power;
   a third lens group having a positive refractive power; and
   a fourth lens group,
   wherein, during zooming from a wide angle position to a telephoto position, the interval between the first lens group and the second lens group increases, the interval between the second lens group and the third lens group decreases, and the interval between the third lens group and the fourth lens group varies, and
   wherein the fourth lens group comprises, sequentially from the object side:
   a first sub-lens group having a positive refractive power;
   a second sub-lens group having a negative refractive power; and
   a third sub-lens group of the fourth lens group, and
   the second sub-lens group is moved along an optical axis to perform focusing.

2. The zoom lens of claim 1, wherein the second sub-lens group of the fourth lens group comprises:
   a first lens having a positive refractive power; and
   a second lens having a negative refractive power.

3. The zoom lens of claim 1, wherein the zoom lens satisfies the following condition:

$$1.5 < f_{42}/fW < -0.2,$$

where "$f_{42}$" denotes the focal length of the second sub-lens group of the fourth lens group and "fW" denotes the overall focal length of the zoom lens at the wide angle position.

4. The zoom lens of claim 1, wherein the zoom lens satisfies the following condition:

$$0.3 < L4g/fW < 0.9,$$

where "L4g" denotes the overall length of the fourth lens group on the optical axis and "fW" denotes the overall focal length of the zoom lens at the wide angle position.

5. The zoom lens of claim 1, wherein the zoom lens satisfies the following condition:

$$0.4 < f1/fT < 0.9,$$

where "f1" denotes the focal length of the first lens group and "fT" denotes the overall focal length of the zoom lens at the telephoto position.

6. The zoom lens of claim 1, wherein the second lens group comprises, sequentially from the object side:
   a first sub-lens group having a negative refractive power; and
   a second sub-lens group having a negative refractive power.

7. The zoom lens of claim 6, wherein the first sub-lens group of the second lens group moves in a direction perpendicular to the optical axis to perform image blur correction.

8. The zoom lens of claim 6, wherein the second sub-lens group of the second lens group moves in a direction perpendicular to the optical axis to perform image blur correction.

9. The zoom lens of claim 6, wherein the second lens group moves in a direction perpendicular to the optical axis to perform image blur correction.

10. The zoom lens of claim 6, wherein the first sub-lens group of the second lens group comprises, sequentially from the object side:
    a first lens having a negative refractive power; and
    a second lens having a positive refractive power.

11. The zoom lens of claim 1, wherein the second lens group is fixed during zooming.

12. A photographing apparatus comprising:
    a zoom lens; and
    an image sensor for converting light focused by the zoom lens into an electric image signal,
    wherein the zoom lens comprises, sequentially from an object side:
    a first lens group having a positive refractive power;
    a second lens group having a negative refractive power;
    a third lens group having a positive refractive power; and
    a fourth lens group,
    wherein, during zooming from a wide angle position to a telephoto position, the interval between the first lens group and the second lens group increases, the interval between the second lens group and the third lens group decreases, and the interval between the third lens group and the fourth lens group varies, and wherein the fourth lens group comprises, sequentially from the object side:

a first sub-lens group having a positive refractive power;

a second sub-lens group having a negative refractive power; and a third sub-lens group of the fourth lens group, and the second sub-lens group of the fourth lens group is moved along an optical axis to perform focusing.

13. The photographing apparatus of claim 12, wherein the zoom lens satisfies the following condition:

$$0.4 < f1/fT < 0.9,$$

where "f1" denotes the focal length of the first lens group and "fT" denotes the overall focal length of the zoom lens at the telephoto position.

14. The photographing apparatus of claim 13, wherein the second lens group comprises, sequentially from the object side:

a first sub-lens group having a negative refractive power; and a second sub-lens group having a negative refractive power.

15. The photographing apparatus of claim 14, wherein the first sub-lens group of the second lens group moves in a direction perpendicular to the optical axis to perform image blur correction.

16. The photographing apparatus of claim 15, wherein the first sub-lens group of the second lens group comprises, sequentially from the object side:

a first lens having a negative refractive power; and a second lens having a positive refractive power.

* * * * *